United States Patent [19]

Tominaga et al.

[11] Patent Number: 5,189,354

[45] Date of Patent: Feb. 23, 1993

[54] ANGULAR POSITION SELECTING APPARATUS

[75] Inventors: Tsutomu Tominaga; Akira Watanabe, both of Hyogo, Japan

[73] Assignee: Mitsubishi Denki Kabushiki Kaisha, Tokyo, Japan

[21] Appl. No.: 643,245

[22] Filed: Jan. 18, 1991

[30] Foreign Application Priority Data

Jan. 20, 1990 [JP] Japan .................................. 2-10809

[51] Int. Cl.⁵ ............................................. G05B 11/01
[52] U.S. Cl. .................................... 318/671; 318/290; 318/590
[58] Field of Search ............... 188/267, 299, 319, 282, 188/322.15, 322.22; 318/560, 590–596, 600–601, 671–683, 685, 280–284, 285, 286, 287.8, 290, 122, 494–495, 498, 523, 686

[56] References Cited

U.S. PATENT DOCUMENTS

| 4,028,599 | 6/1977 | Zankl et al. ...................... 318/671 X |
| 4,684,866 | 8/1987 | Nehmer et al. .................. 318/685 X |
| 4,710,690 | 12/1987 | Reid et al. ....................... 318/685 |
| 4,942,346 | 7/1990 | Ardot et al. ..................... 318/293 X |
| 5,034,670 | 7/1991 | Tominaga ........................ 318/436 |

Primary Examiner—William M. Shoop, Jr.
Assistant Examiner—David Martin
Attorney, Agent, or Firm—Sughrue, Mion, Zinn, Macpeak and Seas

[57] ABSTRACT

A permanent magnet rotor is connected to an output shaft and has more than one pair of magnetic poles. A stator has three phases connected in Y-connection including a first phase, a second phase, and a third phase. Each phase has as many series-connected coils as there are pairs of the poles of the magnet rotor. A timer circuit outputs a first signal for a predetermined length of time when a target angular position of said rotor is selected. On the basis of a present angular position of the rotor and the target angular position of the rotor, a rotation direction commanding circuit outputs a second signal indicative of the rotation direction of rotor. In accordance with the signal, a current polarity control circuit supplies a first current to the first phase (sub-coils) in accordance with the first signal and a second current to the second and third phases (main coils) in accordance with the second signal so as to drive the rotor into rotation to the target angular position. The first phase is supplied the first current for a predetermined length of time in accordance with the first signal. The second and third phases remain supplied the current to them so that the rotor stays at the target angular position.

3 Claims, 13 Drawing Sheets

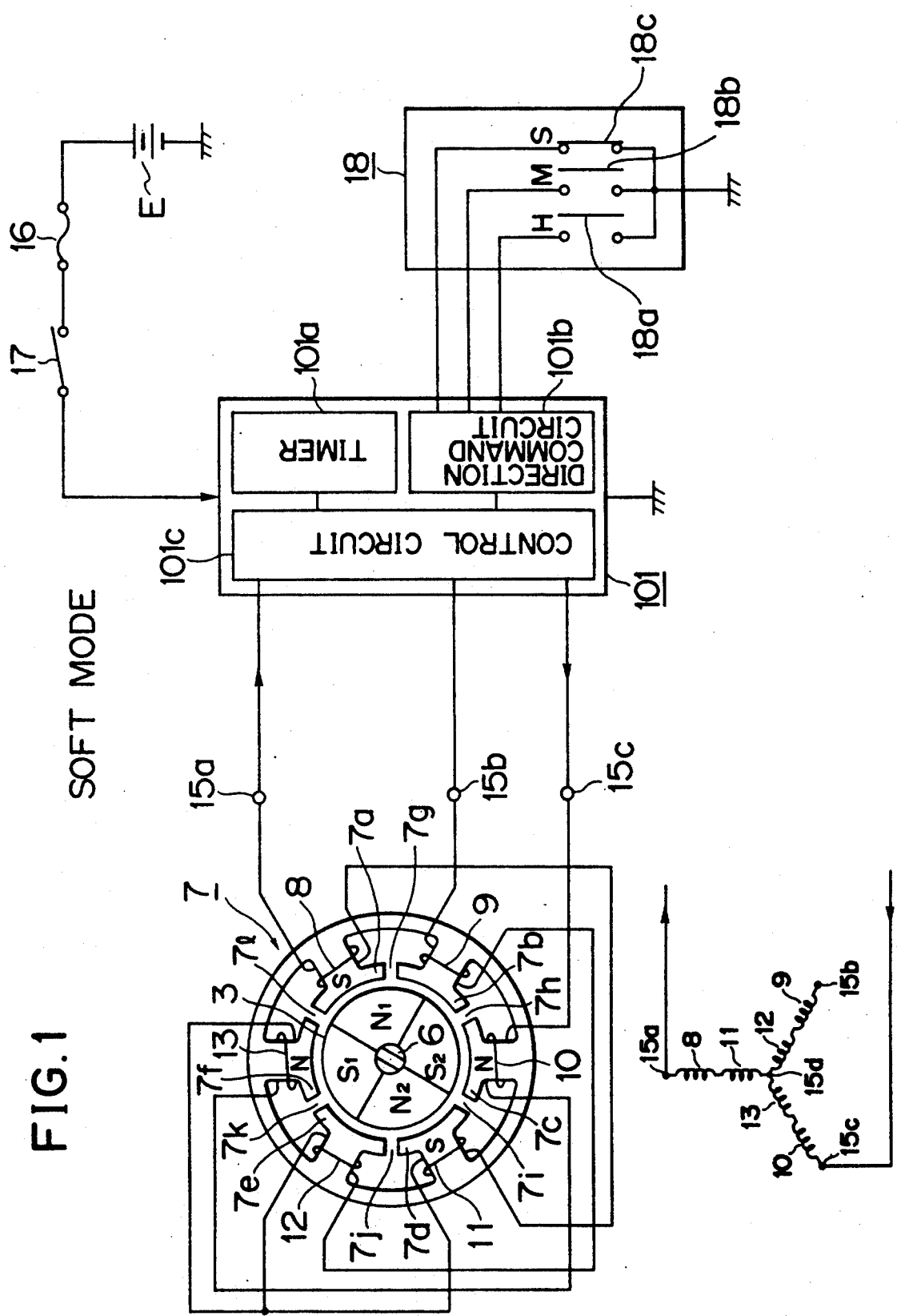

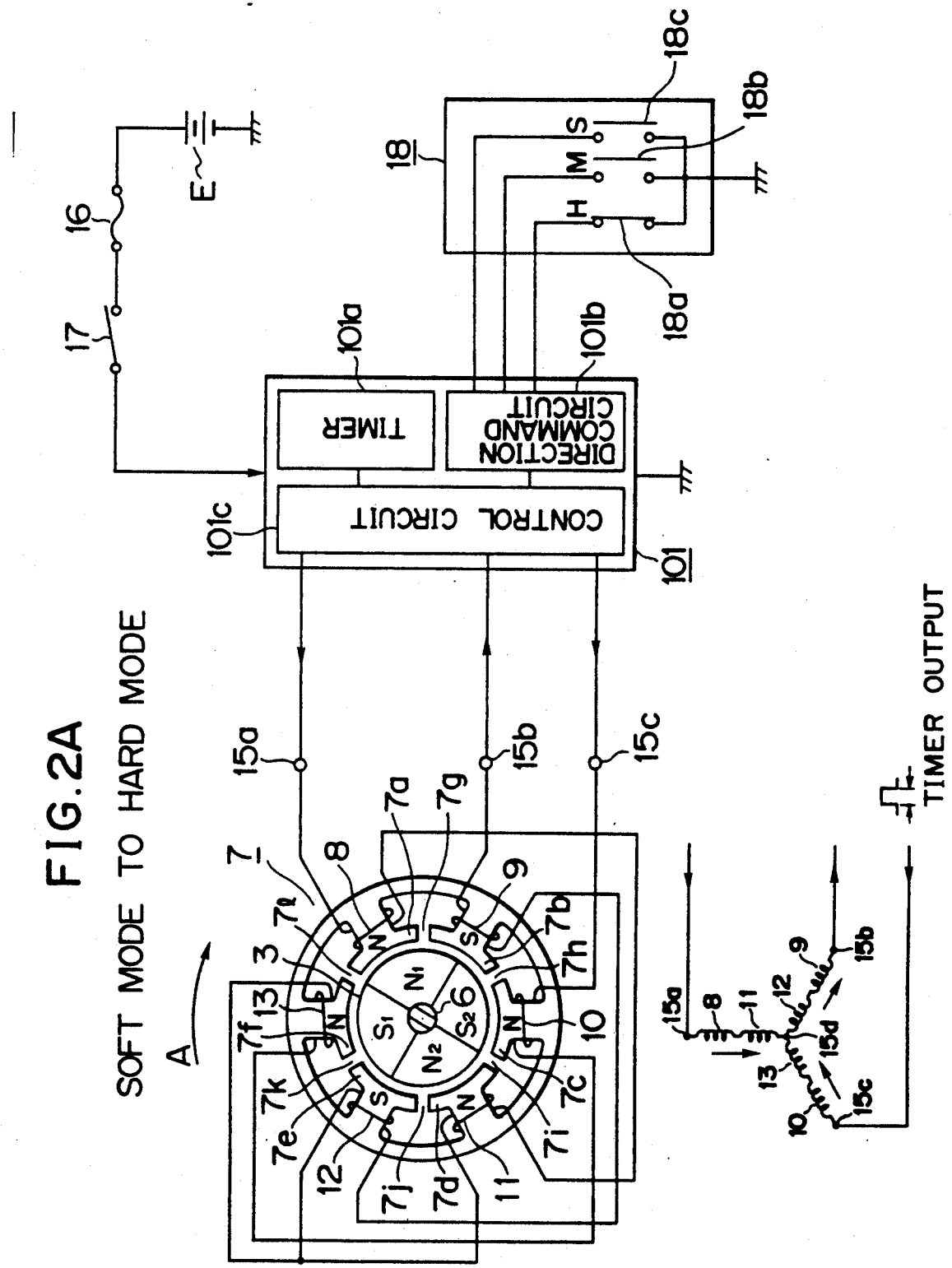
FIG.2A SOFT MODE TO HARD MODE

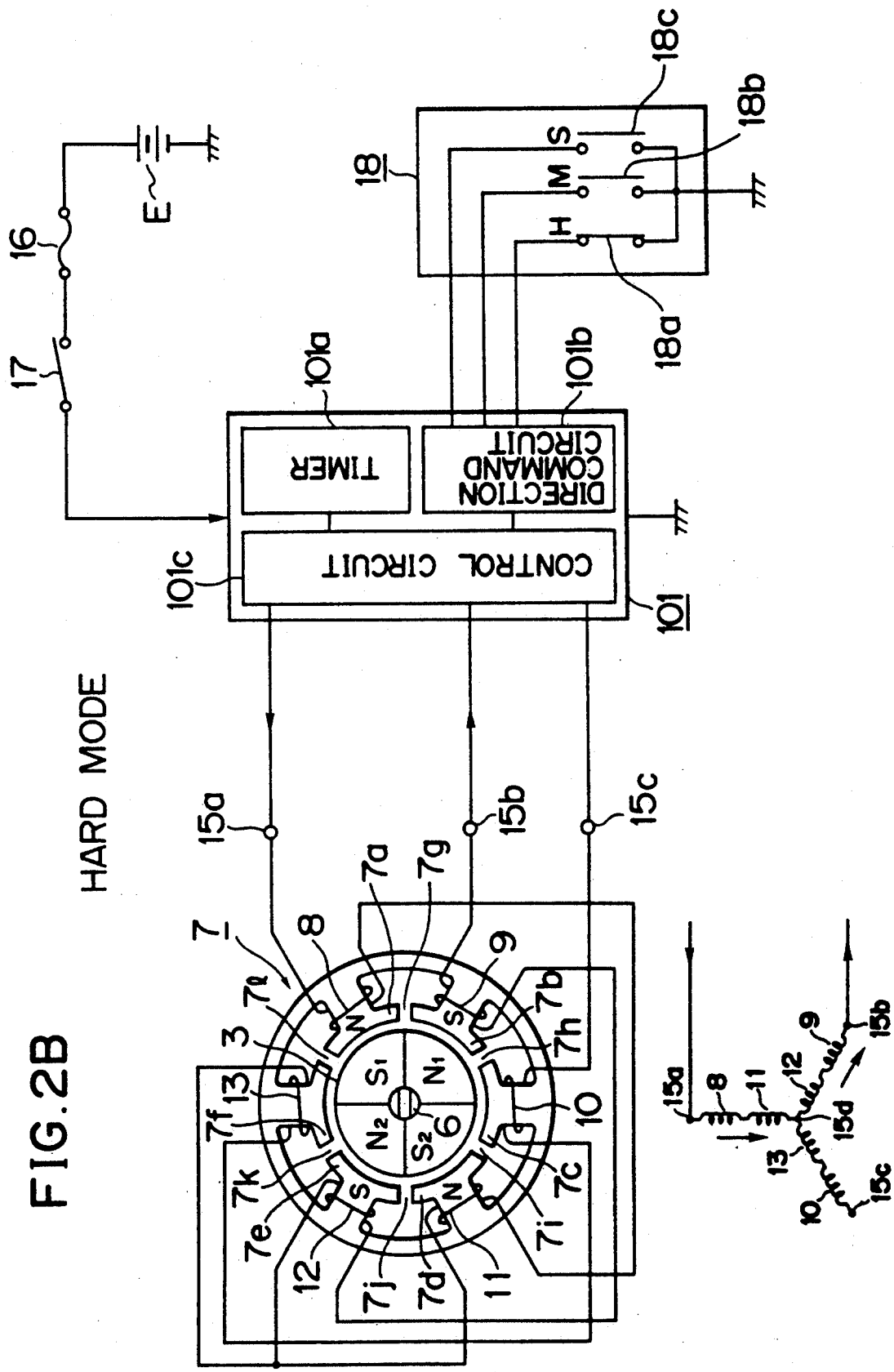
FIG. 2B  HARD MODE

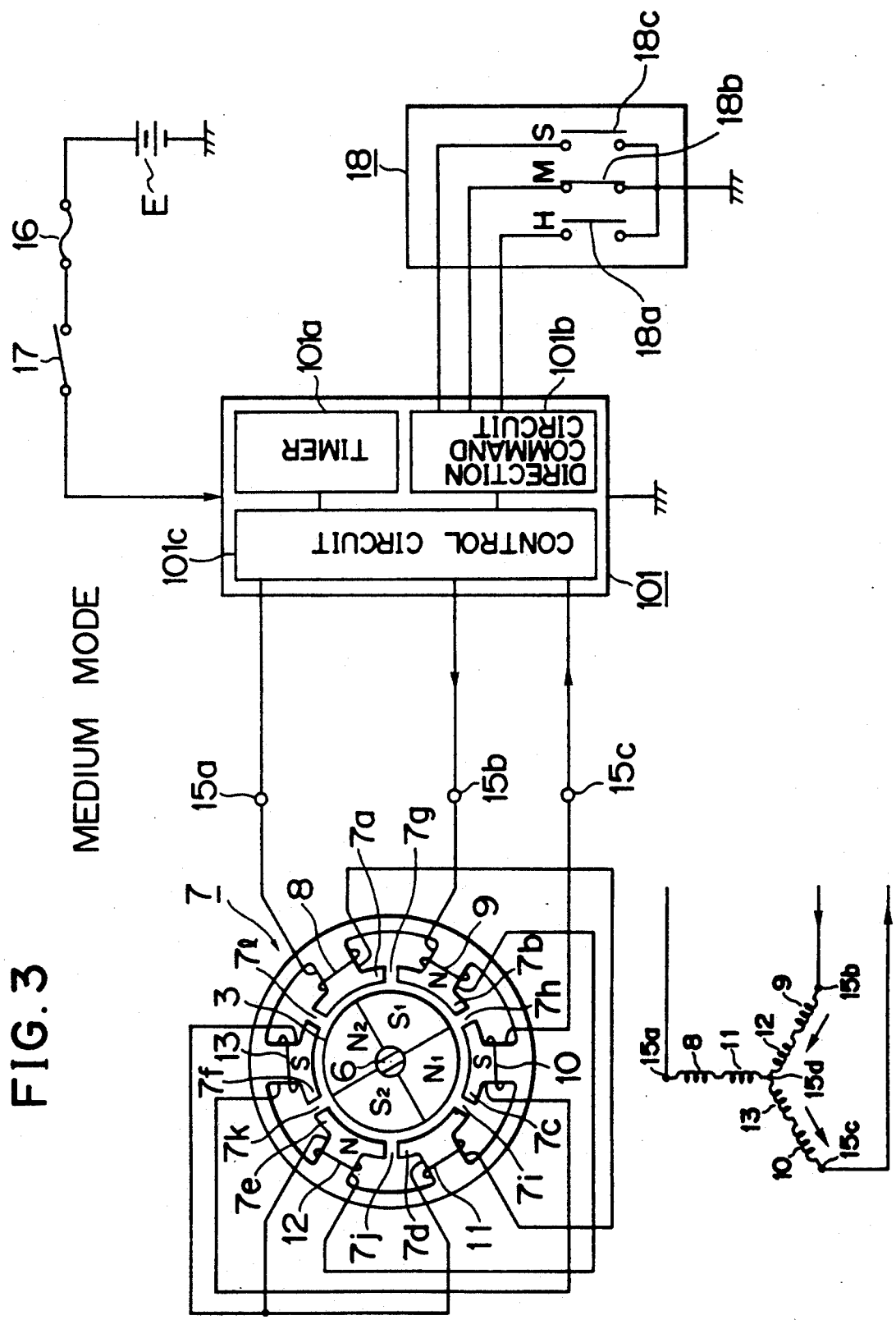
FIG. 3 MEDIUM MODE

SOFT TO HARD

SOFT TO MEDIUM

MEDIUM TO HARD

MEDIUM TO SOFT

HARD TO SOFT

HARD TO MEDIUM

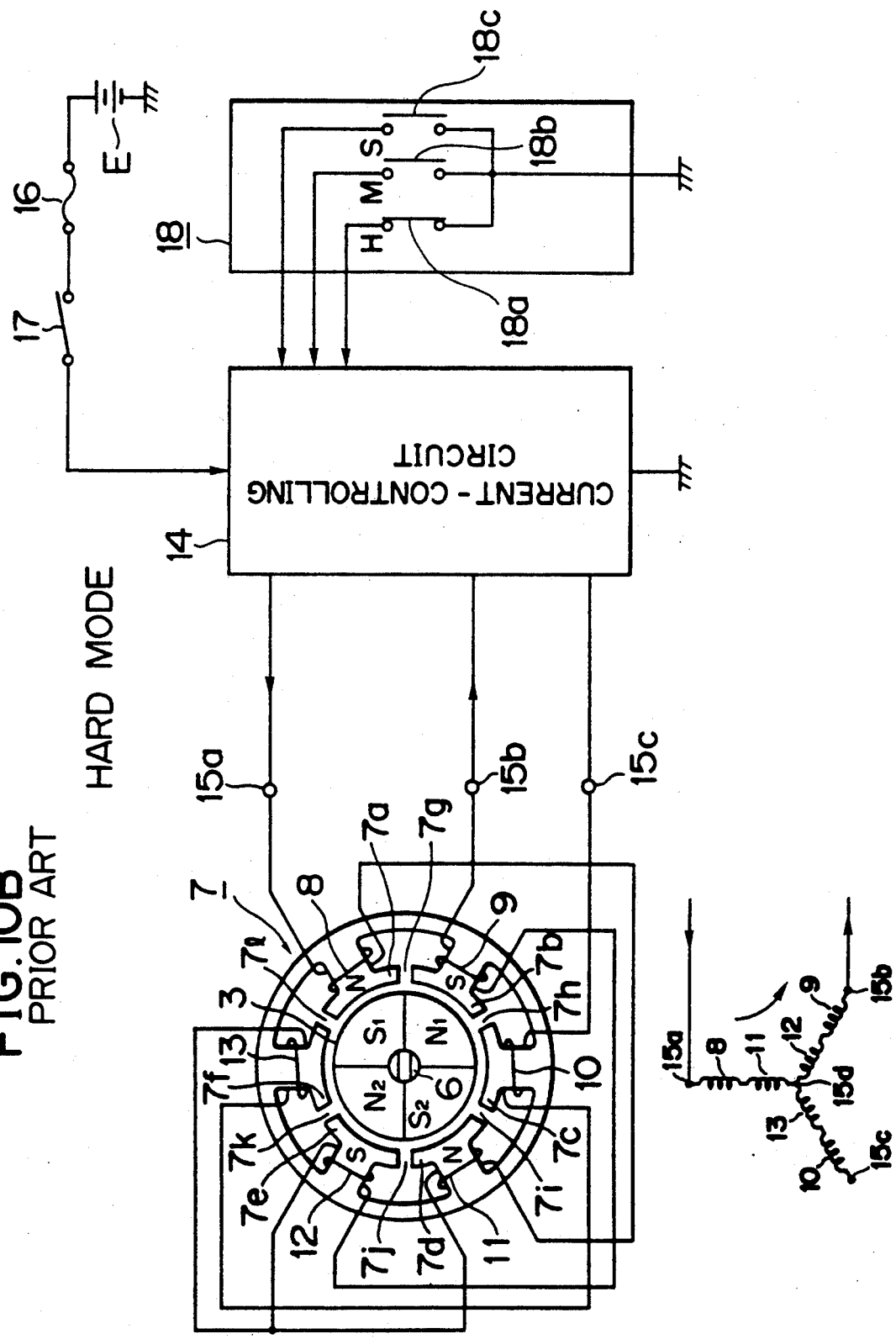

MEDIUM MODE

ANGULAR POSITION SELECTING APPARATUS

BACKGROUND OF THE INVENTION

1. Field of the Invention

The present invention relates to an angular position selecting apparatus in a variable damping-force type suspension system in which the cross-sectional area of oil path in a shock absorber is varied in accordance with the angular position of output shaft of an actuator.

2. Prior Art

FIG. 9 shows a conventional angular position selecting apparatus and FIGS. 10 and 11 illustrate the operation thereof. Referring to FIGS. 9-11, a permanent magnet 3 having two pairs of magnetic poles (i.e., four poles) is secured to an output shaft 6. A stator 7 is in coaxial relation with the magnet 3 so that salient poles 7a-7f are disposed circumferentially around the magnet 3 with some clearance between the magnet 3. The magnet 3 serves as a rotor, and is adapted to drive the shaft 6 into rotation when the stator 7 is energized.

The six salient poles 7a-7f are disposed in a diametrically opposed relation with each other, opposite poles being of the same magnetic polarities. The respective salient poles are each mounted a first to six windings 8-13 thereon, each of which forming an electromagnet. The six windings are connected to form a three-phase Y-connection as a whole as shown in FIG. 4. Between each and the next salient pole is provided with an opening (7g-7l). The winding 8 mounted on the pole 7a is in series with the winding 11 mounted on the pole 7d. Likewise, the winding 9 mounted on the pole 7b is in series with the winding 12 mounted on the pole 7e, and the winding 10 mounted on the pole 7c in series with the winding 13 mounted on the pole 7f.

A current-controlling circuit 14 is connected with a selector switch 18. The selector switch 18 incorporates three switching elements 18a-18c for the respective modes of operation of the shock absorber; hard (H), medium (M), and soft (S). When an operator closes the switching element corresponding to a desired mode of operation, a current is supplied to corresponding terminals to cause the actuator output shaft 6 to rotate through a predetermined angle, which in turn changes the cross-section of the oil path in the shock absorber. The current-controlling circuit 14 is supplied power by a switch 7 and a fuse 16 connected in series with the positive terminal of a battery E. The battery E has its negative terminal grounded.

The operation of the conventional angular position selecting apparatus in FIGS. 9-10 will now be described with respect to a case where the apparatus is switched from the soft mode to the hard mode. When the operator operates the selector switch 18, the switching element 18c becomes open and switching element 18a closed. This permits the current-controlling circuit 14 to supply a positive voltage to a terminal 15a and a negative voltage to a terminal 15b. Then, a current flows through the terminal 15a, coil 8, coil 11, coil 12, coil 9, and terminal 15b, causing the poles 7a and 7d to become an "N" and the poles 7b and 7e to become an "S."

Shortly after the selector switch 18 is operated to shift from the soft mode to the hard mode, the permanent magnet 3 or rotor is at a position shown in FIG. 10A where the pole 7a (N) repels the pole N1 of the rotor 3 while the pole 7d repels the pole N2 of the rotor 3. Further, the pole 7b (S) repels the pole S2 of the rotor 3 while the pole 7e attracts the pole N2 of the rotor 3. Moreover, the pole 7b (S) attracts the pole N1 of the rotor 3 while the pole 7e repels the pole S1 of the rotor 3. As a result, a clockwise torque acts on the rotor 3 to cause the output shaft 6 to rotate therewith.

Thus, the rotor 3 rotates through 60 degrees from the position in FIG. 10A and comes to rest at an angular position, as shown in FIG. 10B, where the pole S1 of the rotor 3 faces and attracts the pole 7a (N) and the pole S2 of the rotor 3 faces and attracts the pole 7d (N). At this angular position of the rotor 3, the pole N1 of the rotor 3 faces and attracts the pole 7b (S), and the pole N2 of the rotor 3 faces and attracts the pole 7e (N).

Should the rotor 3 overrotate clockwise due to inertia, the pole S1 of the rotor 3 moves close to the pole 7b to repel each other while at the same time the pole S2 of the rotor 3 moves close to the pole 7e (S) to repel each other. This exerts a counterclockwise torque on the rotor 3 so that the rotor 3 returns where it is supposed to be.

Conversely, should the rotor 3 overrotate counterclockwise for some reason, the pole N1 of the rotor 3 repels the pole 7a (N) and the pole N2 of the rotor 3 repels the pole 7d (N). Also, the pole S1 of the rotor 3 is pulled back by the pole 7a (N), and the pole S2 of the rotor 3 is pulled back by the pole 7d (N).

Consequently, the torque acting on the rotor 3 always tends to hold the rotor 3 at the angular position such that the opening 7g is aligned with the rotor 3 at the part where the poles N1 and S1 are put together, and the opening 7j is aligned with the rotor 3 at the part where the poles N2 and S2 are put together.

The other modes can be selected by applying voltages of proper polarities to the terminals 15a-15c as shown in Table 1 via the current-controlling circuit 14.

TABLE 1

| Mode | terminal 15a | terminal 15b | terminal 15c |
|---|---|---|---|
| soft | (−) | none | (+) |
| medium | none | (+) | (−) |
| hard | (+) | (−) | none |

Friction forces and the force of inertia in the oil path impose heavy loads on the actuator when the rotor 3 starts to rotate. As depicted by curve B shown in FIG. 8, the above-described conventional apparatus exhibits a maximum torque at an angle of about 15 degrees from the position where the rotor 3 is at rest in any mode, and shows a very small torque when the rotor 3 starts to rotate. A small torque may take longer time for the rotor 3 to settle at a desired angular position or may be too small for the rotor 3 to rotate.

SUMMARY OF THE INVENTION

An object of the invention is to provide an angular position selecting apparatus in which a large torque is maintained over as wide a range of angular position of a rotor as possible shortly after the rotor starts to rotate.

A permanent magnet rotor is connected to an output shaft and has more than one pair of magnetic poles. A stator has three phases of wire connected in Y-connection including a first phase, a second phase, and a third phase. Each phase has as many series-connected coils as there are pairs of the poles of the magnet rotor. On the basis of a present angular position of the rotor and a target angular position of the rotor, a rotation direction commanding circuit outputs a signal indicative of the rotation direction of rotor. In accordance with the signal, a current polarity control circuit supplies a first current to the first phase (subcoils) and as well as a second current to the second phases (main coils) so as to drive the rotor into rotation to the target angular position. The first phase remains supplied a current until the rotor has rotated through an angle of about 15 degrees. The second and third phases remain supplied the current thereto so that the rotor stays at the target angular position.

BRIEF DESCRIPTION OF THE DRAWINGS

Features and other objects will be more apparent from the description of the preferred embodiment with reference to the accompanying drawings in which;

FIG. 1 shows an angular position selecting apparatus according to the present invention when it is in the soft mode;

FIG. 2A shows the angular position selecting apparatus of FIG. 1 when it is being shifted from the soft mode to the hard mode;

FIG. 2B shows the angular position selecting apparatus of FIG. 1 when it is in the hard mode;

FIG. 3 shows the angular position selecting apparatus of FIG. 1 when it is in the medium mode;

FIG. 10B shows the conventional angular position selecting apparatus when it is in the hard mode.

DESCRIPTION OF THE PREFERRED EMBODIMENTS

Figure 4:
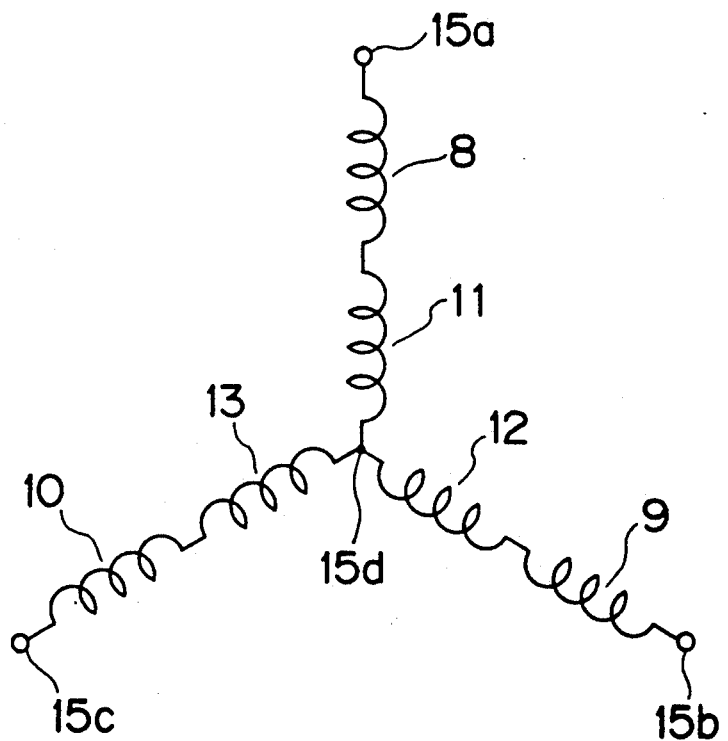
FIG. 4 shows the three phases in Y-connection in a prior art apparatus as well as in the present invention.
Figure 9:
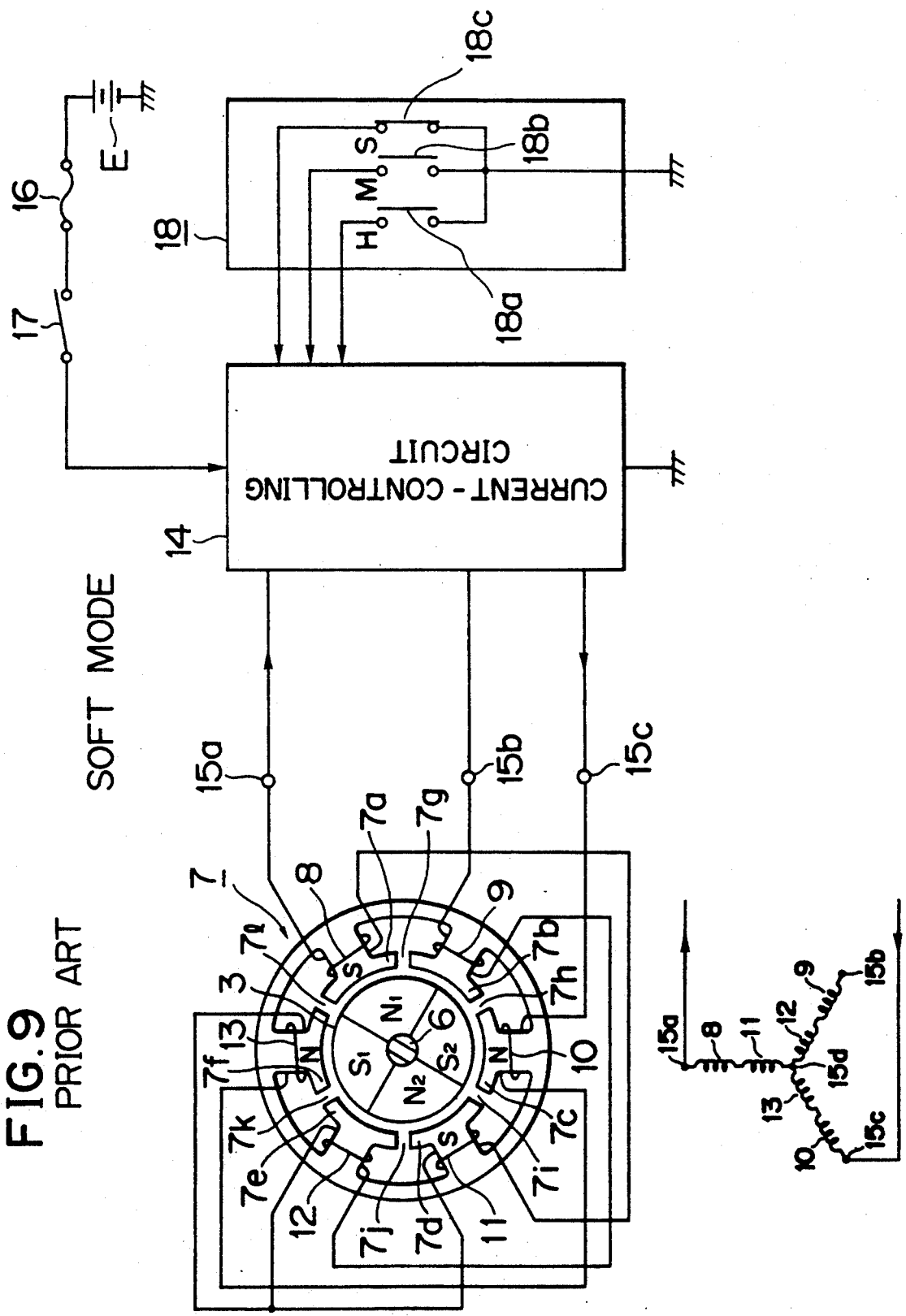
FIG. 9 shows a conventional angular position selecting apparatus when it is in the soft mode.
Figure 10A:
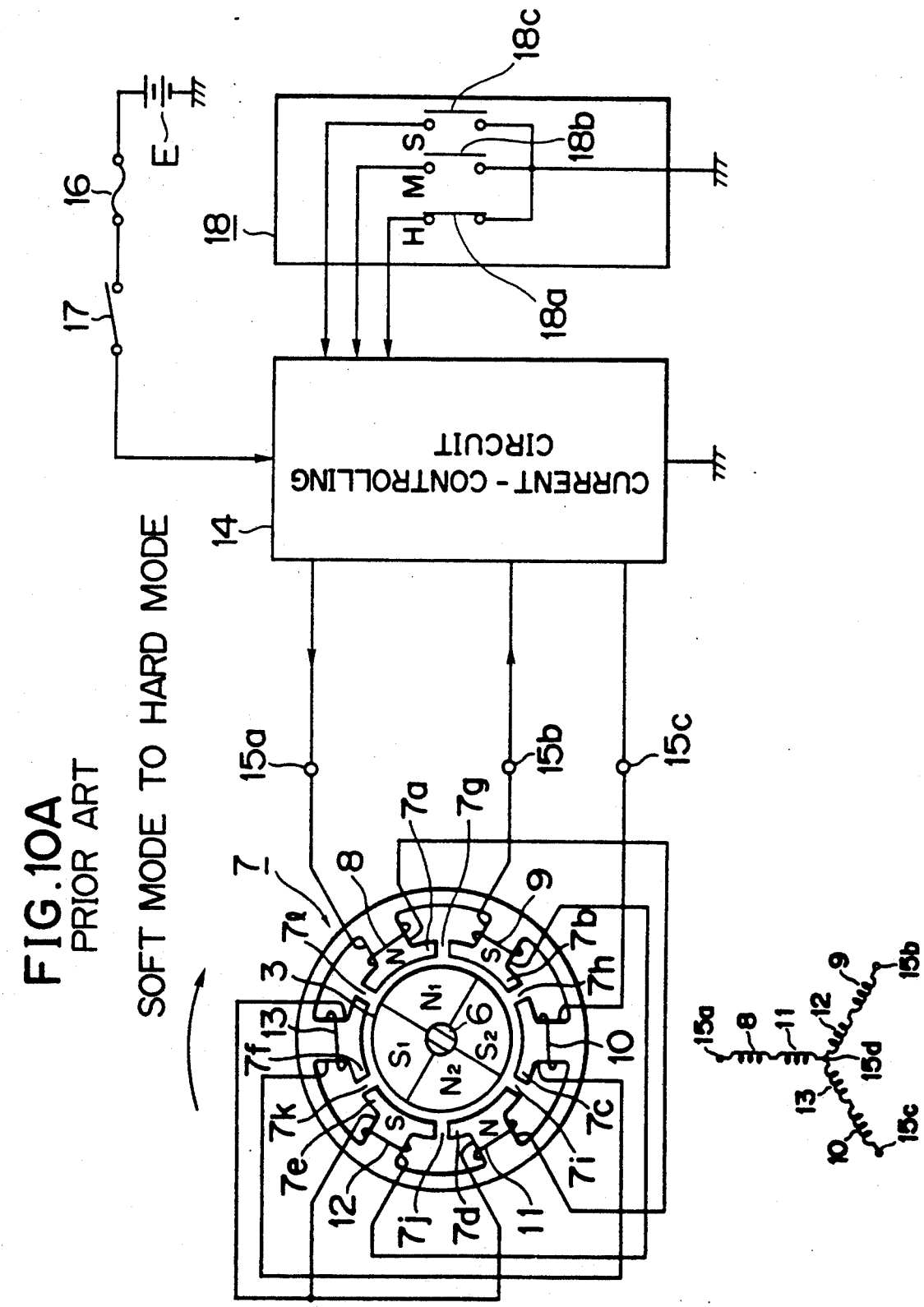
FIG. 10A shows a conventional angular position selecting apparatus when it is being shifted from the soft mode to the hard mode.
Figure 11:
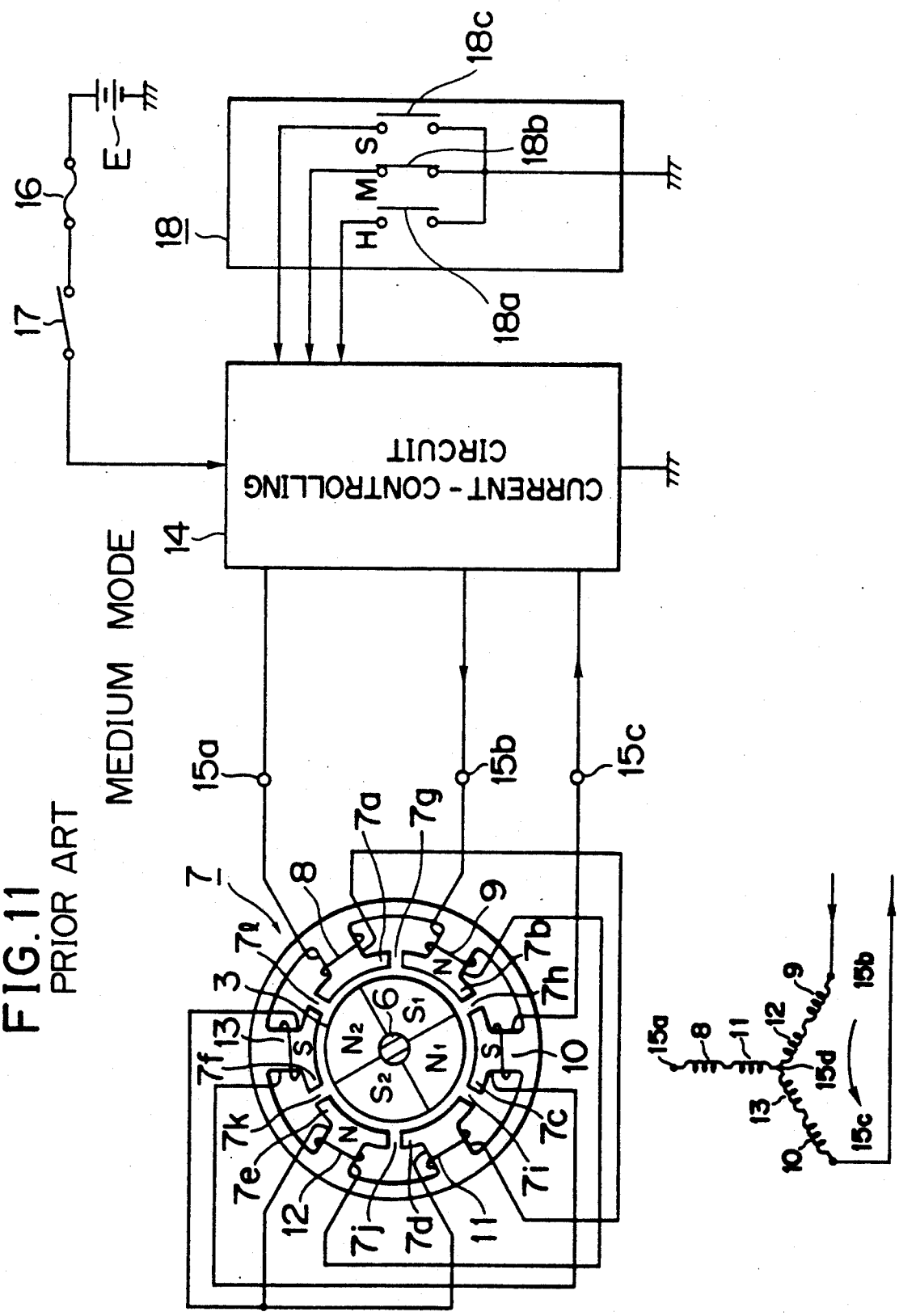
FIG. 11 shows the conventional angular position selecting apparatus when it is in the medium mode.

An embodiment of an angular position selecting apparatus according to the present invention will now be described in detail with respect to the drawings. FIGS. 1-5 show an embodiment of the apparatus. Elements similar to those of the prior art apparatus shown in FIGS. 9-11 have been given similar reference numerals. The embodied apparatus is used for driving an actuator output shaft into rotation to vary the cross-sectional area of oil path in a shock absorber used in variable damping-force suspension systems. The output shaft is driven to different angular positions corresponding to three stages of shock absorbing operation; soft, medium, and hard. The stator 7 has three pairs of coils, each of which forms one of three phases connected in Y-connection with a neutral point 15d as shown in FIG. 4.

Figure 6A:
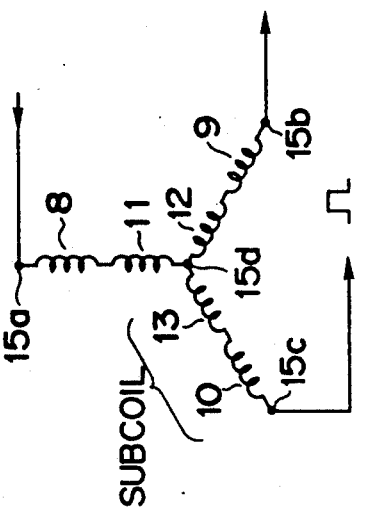
FIGS. 6A-6F show the three phases in Y-connection energized in various modes.
Figure 6B:
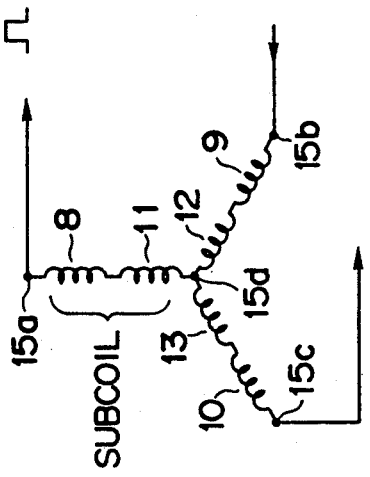
Figure 6C:
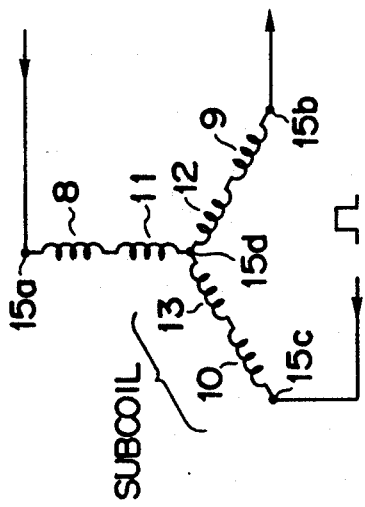
Figure 6D:
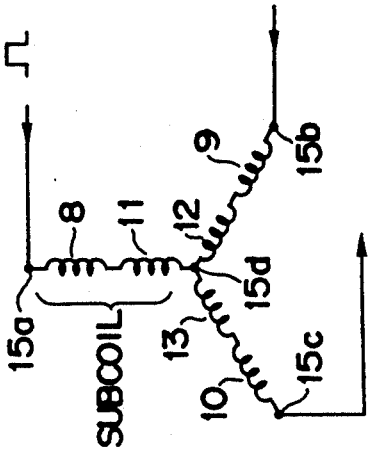
Figure 6E:
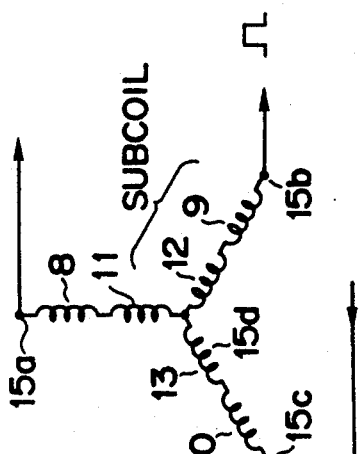
Figure 6F:
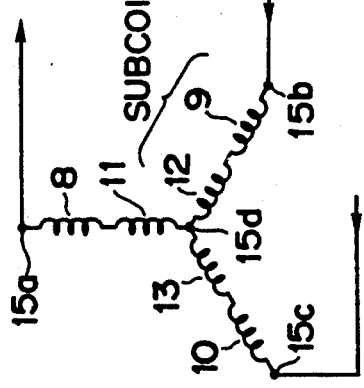

FIGS. 6A-6B show the three phases energized in various modes. In the respective mode, selected two phases (referred to as paired main coils hereinafter) are supplied a current continuously in a specific direction while at the same time the remaining phase (referred to as subcoils hereinafter) is supplied a current in a specific direction for a predetermined length of time. A control circuit 101 incorporates a timer circuit 101a and a rotation-direction commanding circuit 101b. The present angular position of the rotor 3 is stored in a memory 101e. The target angular position can be determined from the positions of the switching elements 18a-18c immediately before and after the operator operates the selector switch 18 to select a new mode.

On the basis of the present angular position and the target angular position of the rotor 3, the rotation-direction commanding circuit 101b provides a clockwise-rotation signal for the clockwise rotation of rotor 3 and a counterclockwise-rotation signal for the counterclockwise rotation. The timer circuit 101a is turned on shortly after a new mode is selected, and the timer circuit 101a remains on for a predetermined time length during which the subcoils are energized. For an actuator having a required actuation time of 30 msec, for example, the setting of the timer 101a is 10-20 msec.

Figure 8:
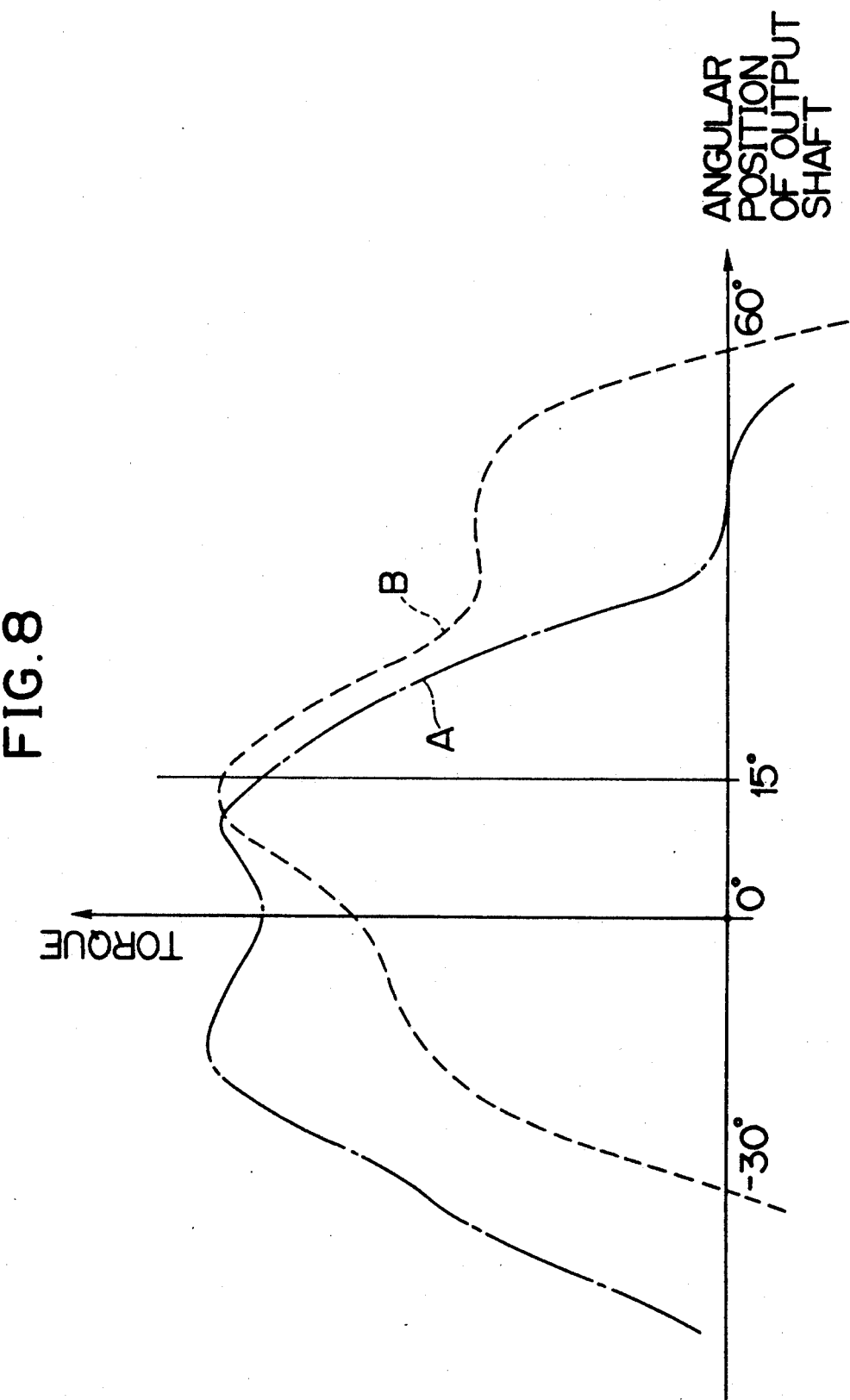
FIG. 8 shows the torque characteristics of the angular position selecting apparatus of the present invention, curve A showing angular position versus torque when both the subcoils and paired main coils are energized to rotate and curve B representing angular position versus torque when only the paired main coils are energized.

FIG. 8 shows the torque characteristics of the actuator used in this embodiment, where curve A shows angular position versus torque when both the subcoils and paired main coils are energized to rotate in either direction and curve B represents angular position versus torque when only the paired main coils are energized to rotate in either direction.

In the embodiment, both the paired main coils (two phases) and the subcoils (remaining phase) are energized while the rotor 3 rotates through an angle of about 15 degrees from its previous angular position so that the torque applied to the rotor 3 follows curve A. Meanwhile, subcoils are energized only while the rotor 3 rotates through 15-60 degrees toward the target position so that the torque follows the curve B. Thus, when the rotor 3 starts to rotate, a large torque can be applied to the rotor 3 as opposed to the prior art apparatus. The timer 101a is set to as long a time as the rotor 3 requires to rotate through about 15 degrees, so that the required time for the rotor to arrive at the target angular position is the shortest possible.

Figure 5:
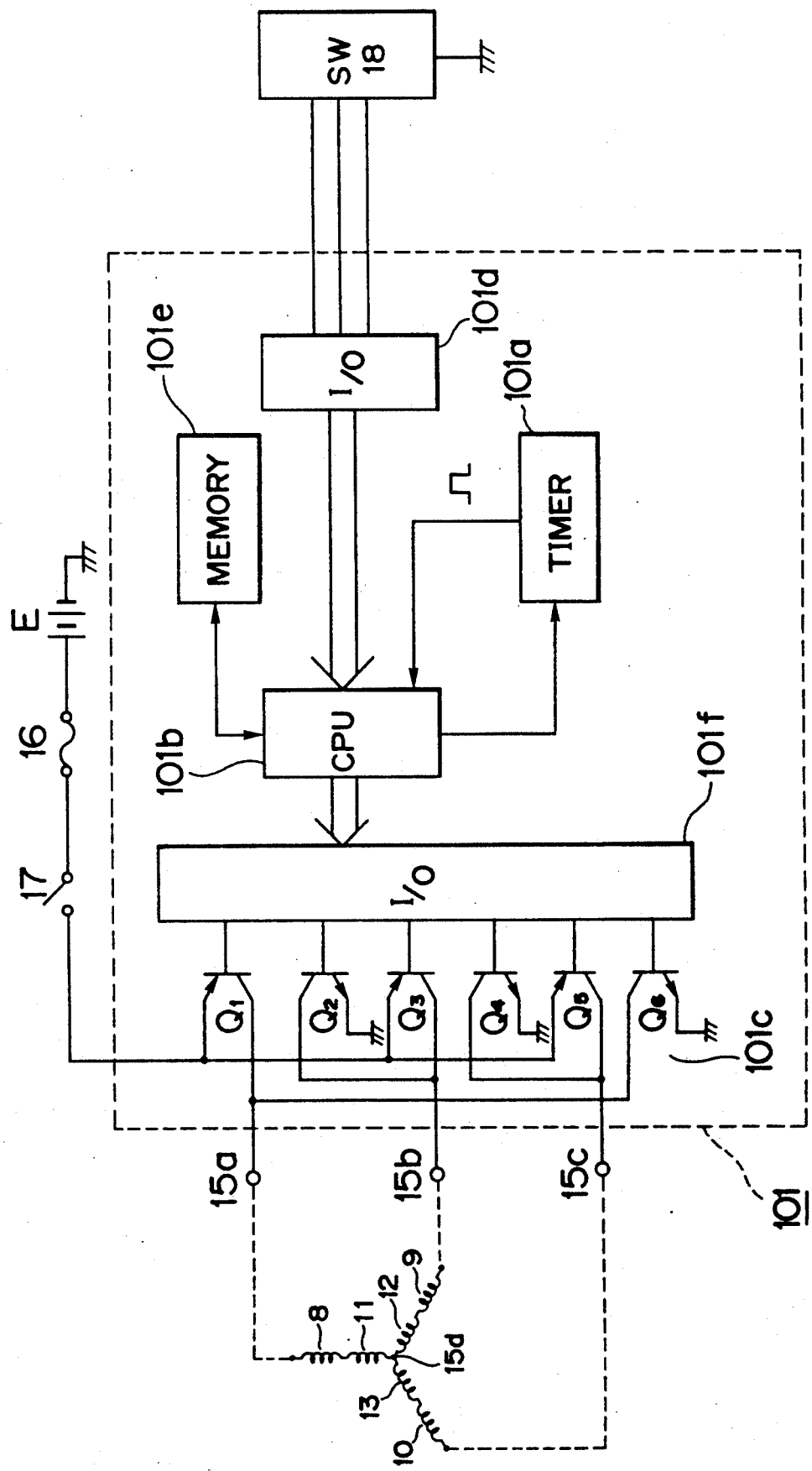
FIG. 5 shows the detailed arrangement of the angular position selecting apparatus according to the present invention.
Figure 7:
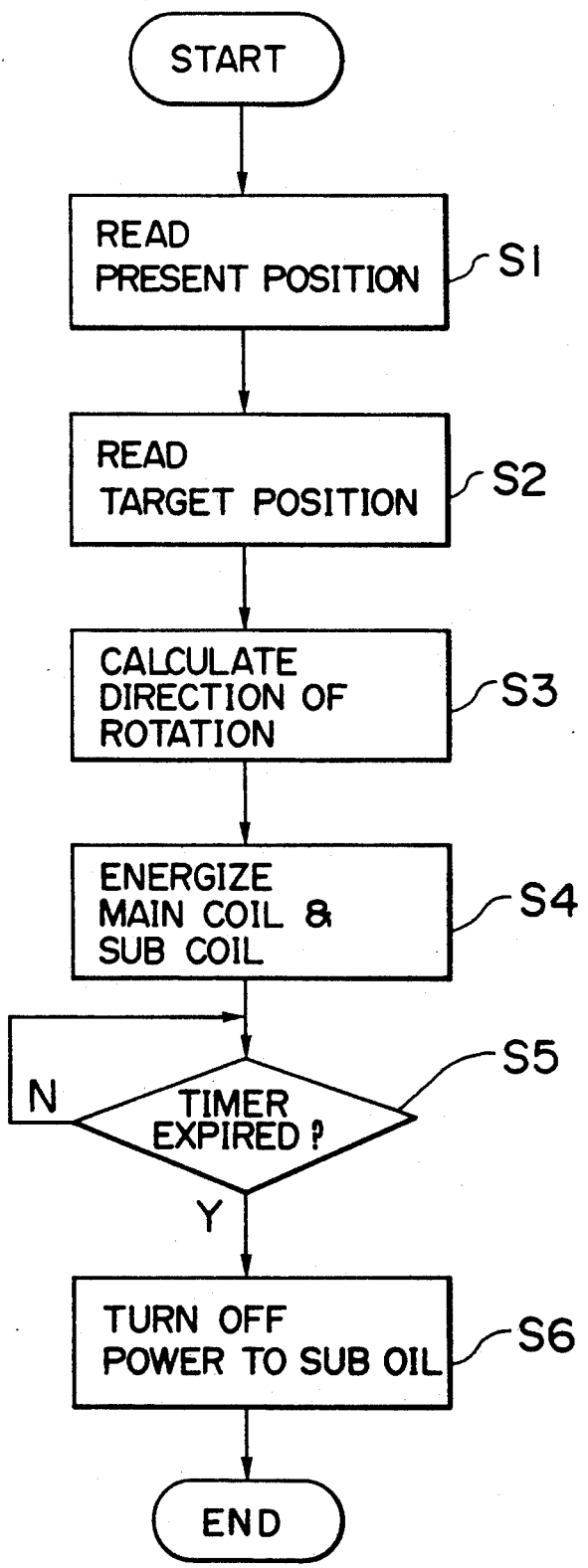
FIG. 7 is a flowchart showing the operation of the embodiment in FIGS. 1-3.

The operation of the angular position selecting apparatus according to the present invention will now be described by way of example of shifting the apparatus from soft to hard with reference to FIGS. 5 and 7. At steps 1 and 2, when the operator operates the selector switch 18 so as to shift from the soft mode in FIG. 1 to the hard mode in FIG. 2B, the CPU 101b reads the present angular position of the rotor 3 from the memory 101e and the target angular position via an I/O port 101d from the selector switch 18. Then, the CPU 101b turns on the timer 101a. At step 3, the CPU performs arithmetic operation on the basis of the present angular position and the target angular position to output the reverse-rotation signal (i.e., clockwise rotation) to the current polarity control circuit 101c. At step 4, transistors Q1 and Q2 are turned on so that the positive voltage is supplied to the terminal 15a and the negative voltage to the terminal 15b, and a transistor Q5 is turned on so that the positive voltage is supplied to the terminal 15c. In this mode, the coils 8,11 and the coils 9,12 play a role of the paired main coils while the coils 10 and 13 serve as the subcoils. Thus, a current flows into the terminal 15a, through the coils 8 and 11, and into the neutral point 15d while another current flows into the terminal 15c, through the coils 10 and 13 into the neutral terminal 15d. The resultant current then flows through the coils 12 and 9, and into the terminal 15b. This energization causes the poles 7a, 7c, 7d, and 7f to be magnetized to "N" and the poles 7b and 7e to "S." The pole 7a (N) repels N1 of the rotor 3 and the pole 7d (N) repels N2 of the rotor 3. The pole 7c (N) attracts S2 of the rotor 3 and the pole 7f attracts S1 of the rotor 3. Furthermore, the pole 7b (S) attracts N1 of the rotor 3 and the pole 7e (S) attracts N2 of the rotor 3. The pole 7b (S) repels S2 of the rotor 3 and the pole 7e (S) repels S1 of the rotor 3. This exerts a clockwise torque on the rotor 3 so that the rotor 3 and the output shaft 6 secured thereto are driven into clockwise rotation as shown by the arrow A in FIG. 2A. Meanwhile, the timer 101a is turned on and the CPU 101b monitors the timer output at step 5.

When the timer circuit 101a turns off, the CPU 101b send the signal to cause the current polarity control circuit 101c to turn off the Q5, at step 6, so as to stop current supply to the terminal 15c.

Then, as shown in FIG. 2B, S1 of the rotor 3 faces the pole 7a (N), S2 of the rotor 3 faces the pole 7d (N), N1 of the rotor 3 faces the pole 7b (S), and N2 of the rotor 3 faces the pole 7e, all attracting each other. Then, the rotor 3 comes to rest completing the change of mode from soft to hard.

FIGS. 6A-6F show energization of the respective coils for the specific changes of modes.

While the embodiment has been described with respect to a 60-degree-increment type actuator used in the variable damping-force shock absorber, the embodiment is only exemplary and modification may be made to implement, for example, a 120-degree-increment type actuator using three electromagnets or a 30-degree-increment type using twelve electromagnets as far as the number of electromagnets is three times the number of pairs of permanent magnets.

While the embodiment has been described with respect to an actuator whose stator poles are located around the permanent magnet rotor, the present invention may also be applied to an actuator whose permanent magnet rotor rotates around the stator.

What is claimed:

1. An angular position selecting apparatus comprising:
   a permanent magnet rotor to which an output shaft is connected, said permanent magnet rotor having more than one pair of poles;
   a stator having coils which are grouped into three phases including a first phase, a second phase, and a third phase, said first to third phases being connected in Y-connection, each phase having as many series-connected coils as there are pairs of said poles of the permanent magnet rotor;
   timer means for outputting a first signal for a predetermined length of time when a target angular position of said rotor is selected;
   rotation direction commanding means for outputting, on the basis of a present angular position of said rotor and said target angular position of said rotor, a second signal indicative of a direction in which said rotor is supposed to rotate; and
   current polarity control means for supplying a first current to said first phase in accordance with said first signal and a second current in accordance with said second signal to said third phase so as to drive said rotor into rotation to said target angular position.

2. An angular position selecting apparatus according to claim 1, wherein said first current and said second current have specific polarities in accordance with said present angular position and said target angular position of said rotor.

3. An angular position selecting apparatus according to claim 2, wherein said permanent magnet rotor has two pairs of magnetic poles.

* * * * *